United States Patent
Hsieh et al.

(10) Patent No.: US 8,077,999 B2
(45) Date of Patent: Dec. 13, 2011

(54) IMAGE PROCESSING APPARATUS AND METHOD FOR REDUCING BLOCKING EFFECT AND GIBBS EFFECT

(75) Inventors: Tung-Lin Hsieh, Jhongli (TW); Yu-Wen Huang, Sanchong (TW); Hsin-Hung Lee, Fongshan (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1131 days.

(21) Appl. No.: 11/896,994

(22) Filed: Sep. 7, 2007

(65) Prior Publication Data

US 2008/0181530 A1  Jul. 31, 2008

(30) Foreign Application Priority Data

Jan. 26, 2007  (CN) .................................. 96102951 A

(51) Int. Cl.
*G06K 9/40* (2006.01)
(52) U.S. Cl. ........................................................ 382/266
(58) Field of Classification Search .................. 382/199, 382/266–269
See application file for complete search history.

(56) References Cited

U.S. PATENT DOCUMENTS

| | | | | |
|---|---|---|---|---|
| 5,335,298 | A * | 8/1994 | Hevenor et al. | 382/199 |
| 6,148,115 | A * | 11/2000 | Mackinnon et al. | 382/266 |
| 7,551,792 | B2 * | 6/2009 | Kong et al. | 382/260 |
| 7,751,641 | B2 * | 7/2010 | Petrosyan et al. | 382/266 |
| 7,999,867 | B2 * | 8/2011 | Noh | 348/252 |
| 2005/0025383 | A1 * | 2/2005 | Domingo et al. | 382/266 |
| 2005/0286795 | A1 * | 12/2005 | Zhang | 382/268 |
| 2006/0133690 | A1 * | 6/2006 | Bloomberg et al. | 382/269 |
| 2007/0253634 | A1 * | 11/2007 | Hsieh et al. | 382/257 |
| 2010/0033633 | A1 * | 2/2010 | Dane et al. | 348/625 |

* cited by examiner

*Primary Examiner* — Aaron W Carter
(74) *Attorney, Agent, or Firm* — Thomas|Kayden

(57) ABSTRACT

This invention discloses an image processing apparatus comprising a filter module, an edge detection module, and a processing module. According to where each pixel locates in an image block, the filter module is used to perform the smooth processing on each pixel to generate a second gray level corresponding to each pixel. The edge detection module is used to determine each pixel to be an edge pixel or a non-edge pixel according to the first gray level and the second gray level of each pixel. The processing module is used to calculate a third gray level of each edge pixel according to a weight, the first gray level, and the second gray level; to calculate a fourth gray level of each non-edge pixel according to the weight, the first gray level, and second gray level, and to output all of the third and fourth gray levels.

16 Claims, 7 Drawing Sheets

| | | | | | | | | |
|---|---|---|---|---|---|---|---|---|
| Mb3 | 1 | 0 | 0 | 0 | 0 | 0 | 0 | 0 |
| Mb2 | 2 | 3 | 1 | 1 | 1 | 0 | 0 | 0 |
| Mb1 | 0 | 1 | 1 | 1 | 1 | 0 | 0 | 0 |
| Mb0 | 0 | 1 | 2 | 2 | 2 | 1 | 0 | 0 |
| Mw0 | 0 | 0 | 1 | 2 | 2 | 2 | 1 | 0 |
| Mw1 | 0 | 0 | 0 | 1 | 1 | 1 | 1 | 0 |
| Mw2 | 0 | 0 | 0 | 1 | 1 | 1 | 3 | 2 |
| Mw3 | 0 | 0 | 0 | 0 | 0 | 0 | 0 | 1 |

FIG. 3A

IMAGE PROCESSING APPARATUS AND METHOD FOR REDUCING BLOCKING EFFECT AND GIBBS EFFECT

BACKGROUND OF THE INVENTION

1. Field of the Invention

The invention relates to an image processing apparatus and method, and particularly to an image processing apparatus and method for reducing blocking effect and Gibbs effect.

2. Description of the Prior Art

JPEG and MPEG image compression methods are widely adopted for providing superior image compression. The aforesaid image compression methods are used to dividing an image into multiple image blocks and then transforming, quantizing, and encoding each image block. Therefore, the high frequency of the image is partially lost and the image is partially distorted. Further, blocking effect and Gibbs effect are generated as well. Blocking effect means that many image blocks are occurred in the image; Gibbs effect means that fragments or noise diffusions are occurred at the boundaries of the object of the image. Additionally, a general image processing apparatus utilizes the smooth processing to reduce blocking effect of the image, but the smooth processing usually blurs the whole image, especially the subtitle.

Therefore, a scope of the invention is to provide an image processing apparatus and method to solve the aforesaid problems.

SUMMARY OF THE INVENTION

A scope of the invention is to provide an image processing apparatus and method for reducing blocking effect and Gibbs effect.

According to a preferred embodiment, an inputted image comprises a plurality of image blocks, each of the image blocks comprises a plurality of pixels, and each of the pixels has a first gray level. The image processing apparatus of the invention comprises a filter module, an edge detection module, and a processing module. The filter module, according to where each pixel locates in the image block, performs the smooth processing on each pixel to generate a second gray level corresponding to each pixel. The edge detection module, according to the first gray level and the second gray level of each pixel, determines each pixel to be an edge pixel or a non-edge pixel. The processing module, according to a weight, the first gray level, and the second gray level of each edge pixel, calculates a third gray level corresponding to each edge pixel. According to the weight, the first gray level, and the second gray level of each non-edge pixel, the processing module calculates a fourth gray level corresponding to each non-edge pixel. Further, the processing module outputs the third gray levels and the fourth gray levels.

Accordingly, the image processing apparatus and method of the invention utilize smooth processing and edge detection to respectively adjust gray levels of the edge pixels and the non-edge pixels of the inputted image, so as to reduce blocking effect and Gibbs effect. As a result, the image quality can be highly improved.

The advantage and spirit of the invention may be understood by the following recitations together with the appended drawings.

BRIEF DESCRIPTION OF THE APPENDED DRAWINGS

FIG. 3A is a schematic diagram illustrating the masks utilized by the first filter shown in FIG. 1.

DETAILED DESCRIPTION OF THE INVENTION

Figure 1:
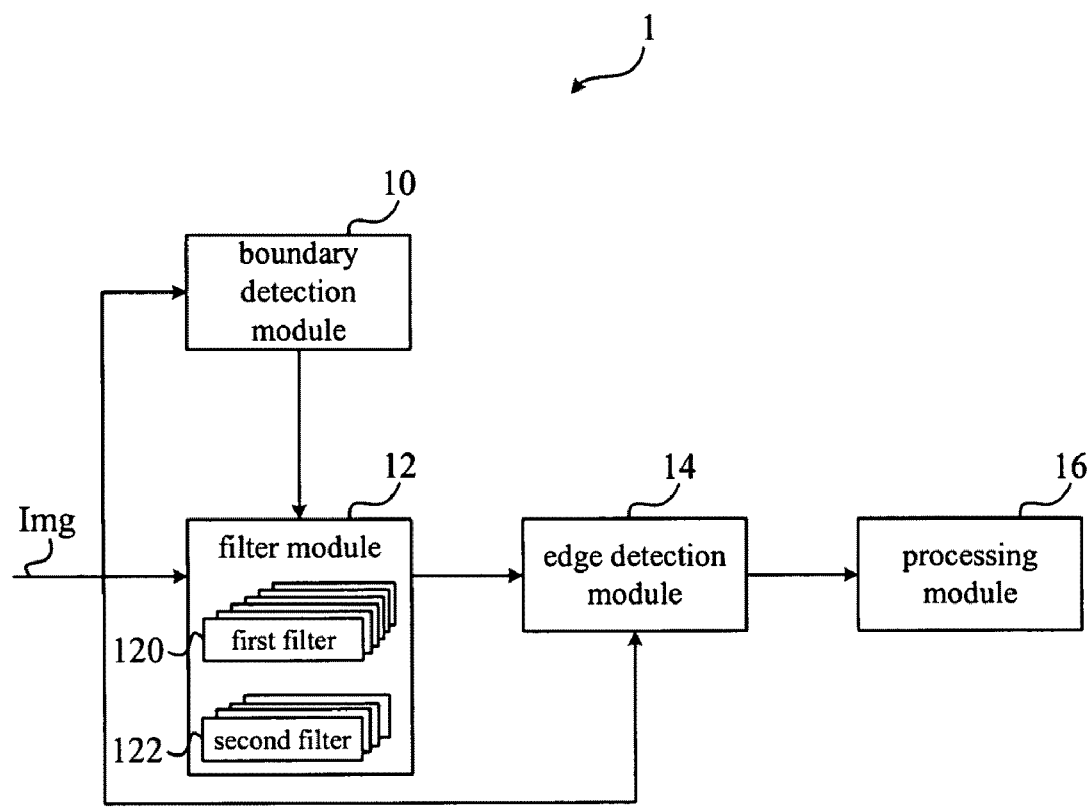
FIG. 1 is a functional block diagram illustrating the image processing apparatus according to a preferred embodiment of the invention.
Figure 2:
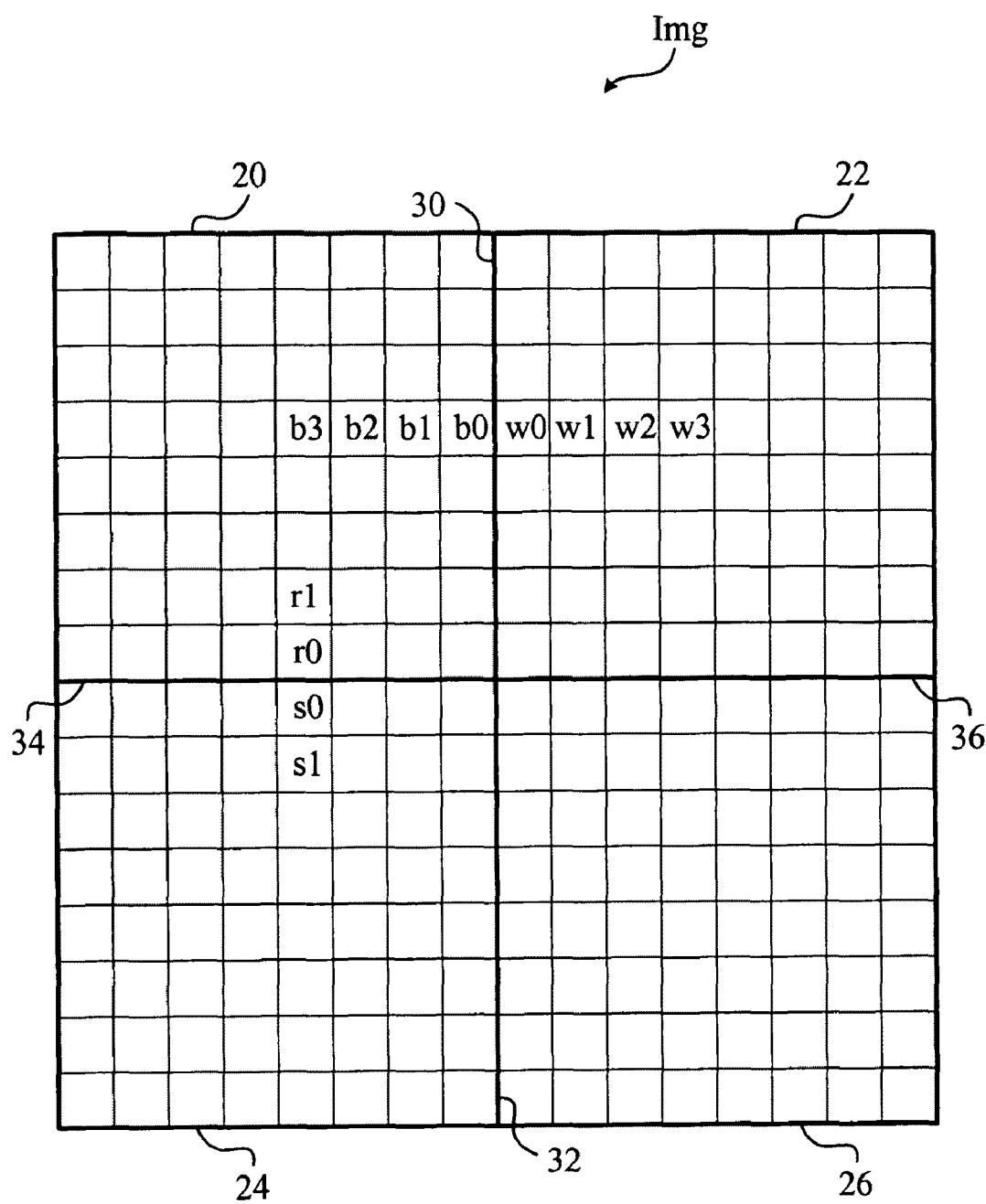
FIG. 2 is a schematic diagram illustrating an inputted image shown in FIG. 1.

Please refer to FIG. 1 and FIG. 2. FIG. 1 is a functional block diagram illustrating the image processing apparatus 1 according to a preferred embodiment of the invention. FIG. 2 is a schematic diagram illustrating an inputted image Img shown in FIG. 1. In this embodiment, the image processing apparatus 1 of the invention is used to reduce blocking effect and Gibbs effect in the inputted image Img.

As shown in FIG. 2, the inputted image Img comprises four image blocks 20-26; each image block 20-26 respectively comprises 8*8 pixels, and each pixel has a first gray level. Additionally, the vertical boundary 30 is located between the image block 20 and 22; the vertical boundary 32 is located between the image block 24 and 26; the horizontal boundary 34 is located between the image block 20 and 24; the horizontal boundary 36 is located between the image block 22 and 26. In practical applications, the inputted image Img complies with one image compression standard selected from a group consisting of, but not limit to, MPEG2, JPEG, or H.263.

As shown in FIG. 1, the image processing apparatus 1 comprises a boundary detection module 10, a filter module 12, an edge detection module 14, and a processing module 16.

The boundary detection module 10 is used for detecting the vertical boundaries 30 and 32 and the horizontal boundaries 34 and 36 between the image blocks 20-26. It should be noticed that if the scaling process is performed on the inputted image Img first, the boundary detection module 10 can further determine the scaling of the inputted image Img, and determine the vertical boundaries 30 and 32 and the horizontal boundaries 34 and 36 according to the scaling. It should be noticed that the boundary detection module 10 can be easily applied by one skilled in the art, so the related description will not be mentioned here again.

Figure 3B:
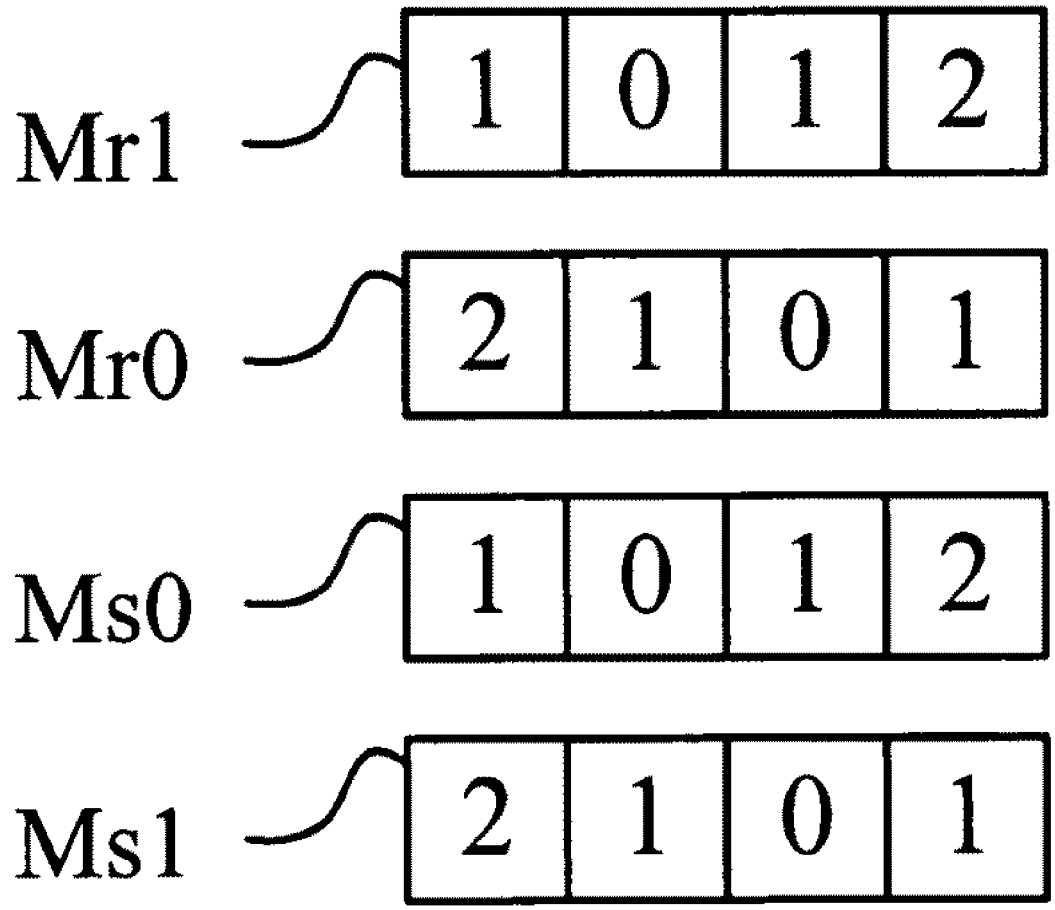
FIG. 3B is a schematic diagram illustrating the masks utilized by the second filter shown in FIG. 1.

Please refer to FIG. 3A and FIG. 3B. FIG. 3A is a schematic diagram illustrating the masks Mw0-Mw3 and Mb0-Mb3 utilized by the first filter 120 shown in FIG. 1. FIG. 3B is a schematic diagram illustrating the masks Mr1, Mr0, Ms0, and Ms1 utilized by the second filter 122 shown in FIG. 1. In this embodiment, the filter module 12, according to where each pixel locates in the image blocks 20-26, performs a smooth processing on each pixel to generate a second gray level corresponding to each pixel. The filter module 12 further comprises eight first filters 120 and four second filters 122, and the first filter 120 or the second filter 122 is a one-dimension filter. For example, the first filter 120 respectively utilizes the masks Mw0-Mw3 and Mb0-Mb3 to perform the smooth processing along a horizontal direction on pixels w0-w3 and b0-b3 near the vertical boundary 30, as shown in FIG. 2 and FIG. 3. The second filter 122 utilizes the masks Mr1, Mr0, Ms0, and Ms1 to perform the smooth processing along a vertical direction on pixels r0, r1, s0, and s1 near the horizontal boundary 34, as shown in FIG. 2 and FIG. 3B. The smooth processing can be easily achieved by one skilled in the art, so the related description will not be mentioned here again. It should be noticed that the number of the first filter, the second filter, and the masks utilized by these filters can be adjusted according to practical applications.

According to the first and the second gray level of each pixel, the edge detection module 14 determines each pixel to be an edge pixel or a non-edge pixel. In this embodiment, the edge detection module 14 will calculate the difference between the first and the second gray level. When the difference is larger than a threshold, the edge detection module 14 sets the pixel as an edge pixel, and when the difference is smaller than or equal to the threshold, the edge detection module 14 sets the pixel as a non-edge pixel. It should be noticed that the threshold can be adjusted according to practical applications.

According to a weight, the first gray level, and the second gray level of the edge pixel, the processing module 16 calculates a third gray level corresponding to the edge pixel; according to the weight, the first gray level, and the second gray level of the non-edge pixel, the processing module 16 calculates a fourth gray level corresponding to the non-edge pixel. In practical applications, the processing module 16 can calculate the third gray level by the equation 1 and the fourth gray level by the equation 2 described as follows:

$$G3=G1*W+G2*(1-W); \text{and} \qquad \text{equation 1:}$$

$$G4=G1*(1-W)+G2*W. \qquad \text{equation 2:}$$

In the equation 1 and equation 2, G1 represents the first gray level; G2 represents the second gray level; G3 represents the third gray level; G4 represents the fourth gray level, and W represents the weight.

For example, a pixel is assumed that the first gray level G1 is 10, the second gray G2 is 20, the threshold is 5, and the weight is 0.8. Because G2−G1=20−10=10, the difference (10) is larger than the threshold (5), such that the pixel is judged as an edge pixel. Substitute G1, G2, and W into the aforesaid equation 1 to obtain the following result: G3=10*0.8+20*(1−0.8)=12. Therefore, the third gray level G3 of the pixel is 12. Accordingly, the third gray level of each edge pixel and the fourth pixel of each non-edge pixel of the inputted image Img can be obtained.

It should be noticed that the weight can be adjusted according to practical applications.

Thereafter, the processing module 16 outputs all of the third gray levels and the fourth gray levels, so as to reduce blocking effect and Gibbs effect in the inputted image Img.

Figure 4:
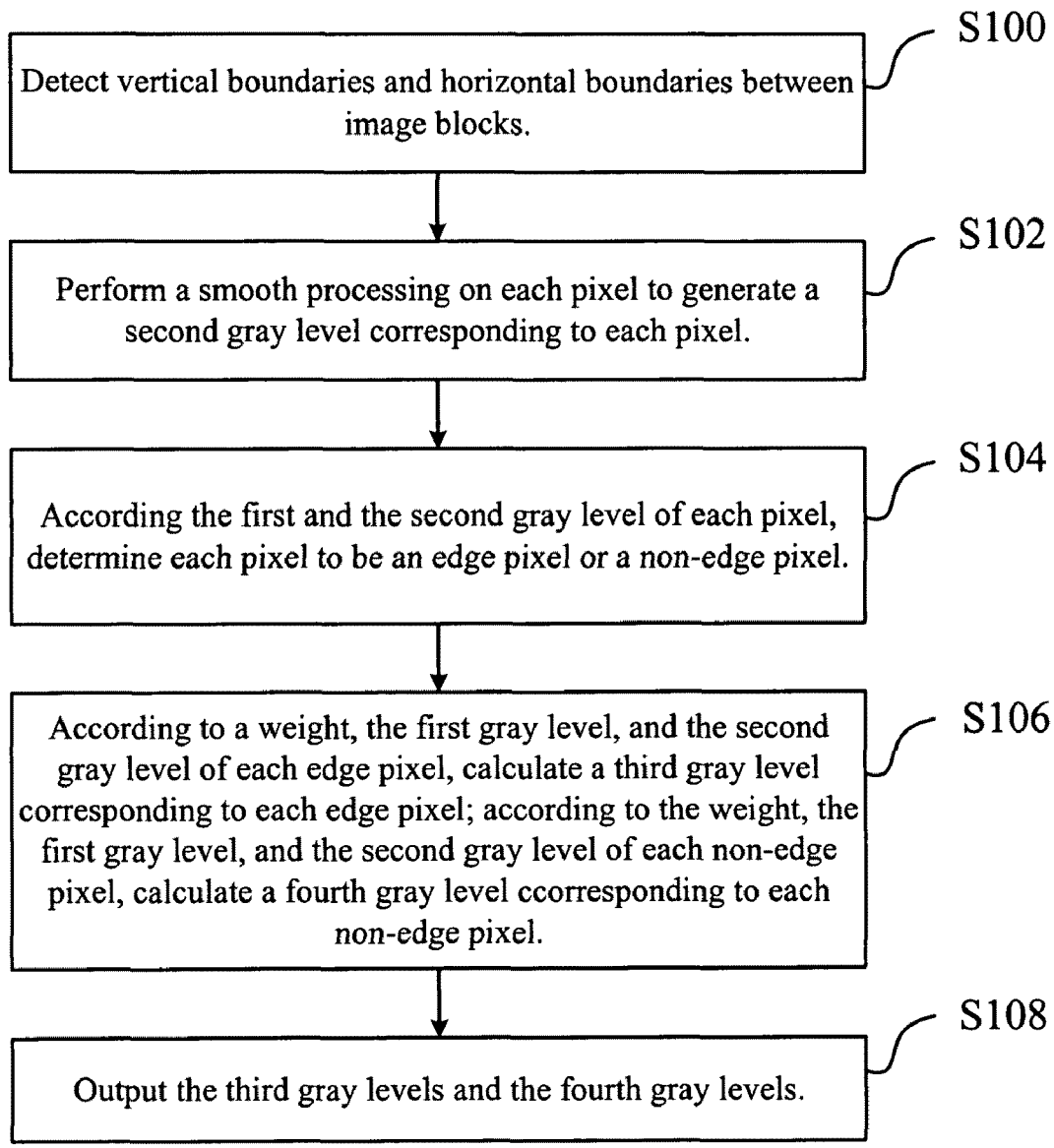
FIG. 4 is a flow chart illustrating the image processing method according to a preferred embodiment of the invention.

Please refer to FIG. 2 and FIG. 4. FIG. 4 is a flow chart illustrating the image processing method according to a preferred embodiment of the invention. As shown in FIG. 4, at first, the step S100 is performed to detect the vertical boundaries 30 and 32 and the horizontal boundaries 34 and 36 between the image blocks 20-26. Afterward, the step S102 is performed to, according to where each pixel locates in the image blocks 20-26, perform the smooth processing on each pixel to generate a second gray level corresponding to each pixel. The step S104 is then performed to, according to the first and the second gray level of each pixel, determine each pixel to be an edge pixel or a non-edge pixel. The step S106 is then performed to, according to a weight, the first gray level, and the second gray level of each edge pixel, calculate the third gray level corresponding to each edge pixel; according to the weight, the first gray level, and the second gray level of each non-edge pixel, calculate the fourth gray level corresponding to each non-edge pixel. At last, the step S108 is performed to output the third gray levels and the fourth gray levels.

Figure 5:
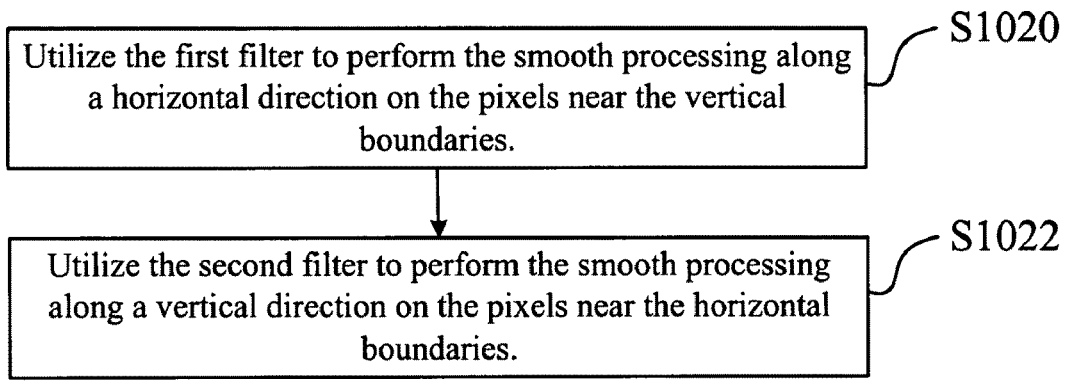
FIG. 5 is a detailed flow chart illustrating the step S102 in FIG. 4.

Please refer to FIG. 5. FIG. 5 is a detailed flow chart illustrating the step S102 in FIG. 4. As shown in FIG. 5, at first, the step S1020 is performed to utilize the first filter 120 to perform the smooth processing along a horizontal direction on the pixels near the vertical boundaries 30 and 32. The step S1022 is then performed to utilize the second filter 122 to perform the smooth processing along a vertical direction on the pixels near the horizontal boundaries 34 and 36.

Figure 6:
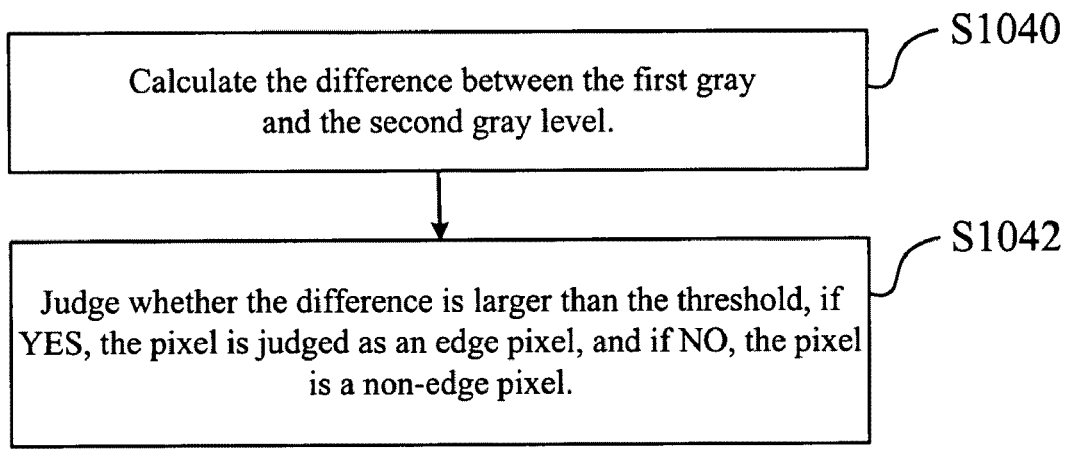
FIG. 6 is a detailed flow chart illustrating the step S104 in FIG. 4.

Please refer to FIG. 6. FIG. 6 is a detailed flow chart illustrating the step S104 in FIG. 4. As shown in FIG. 6, at first, the step S1040 is performed to calculate the difference between the first gray level and the second gray level. The step S1042 is then performed to judge whether the difference is larger than a threshold. If the difference is larger than the threshold, the pixel is judged as an edge pixel; however, if the difference is smaller than or equal to the threshold, the pixel is judged as a non-edge pixel.

Figure 7A:
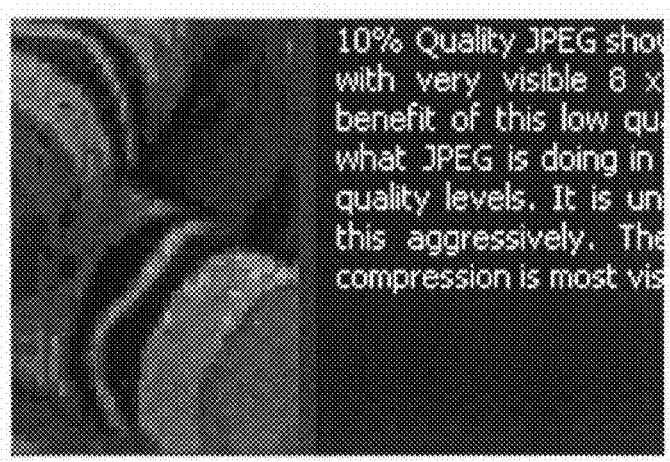
FIG. 7A shows an original image.
Figure 7B:
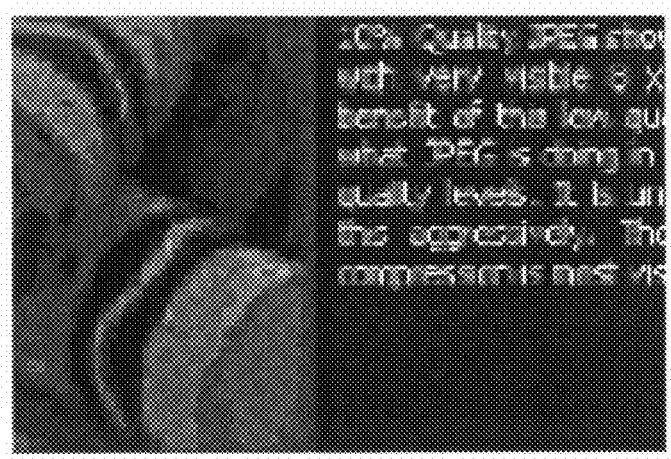
FIG. 7B shows the image after being performed conventional smooth processing.
Figure 7C:
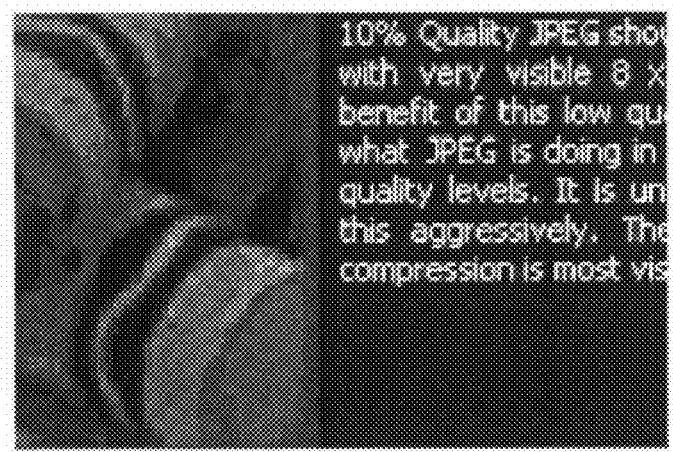
FIG. 7C shows the image after being performed the processing method of the invention.

Please refer to FIG. 7A to FIG. 7C. FIG. 7A is an original image. FIG. 7B is the image after being performed a conventional smooth processing. FIG. 7C is the image after being performed the processing method of the invention. As shown in FIG. 7B and FIG. 7C, compared with the image in FIG. 7B, there are no obvious Gibbs effect in the image in FIG. 7C, especially in the subtitle.

Compared with prior art, the image processing apparatus and method of the invention utilize the smooth processing and edge detection to respectively adjust the gray levels of the edge pixels and the non-edge pixels of the inputted image, so as to reduce blocking effect and Gibbs effect. Accordingly, the image quality can be highly improved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for processing an inputted image, the inputted image comprising a plurality of image blocks, each of the image blocks comprising a plurality of pixels, each of the pixels having a first gray level, the image processing apparatus comprising:

a filter module, according to the corresponding location of each of the pixels in the image block, performing a smooth processing on each pixel to generate a second gray level corresponding to each pixel;

an edge detection module, according to the first gray level and the second gray level of each of the pixels, determining that each of the pixels is an edge pixel or a non-edge pixel; and a processing module, according to a weight, the first gray level, and the second gray level of each edge pixel, calculating a third gray level corresponding to each edge pixel; according to the weight, the first gray level, and the second gray level of each non-edge pixel, calculating a fourth gray level corresponding to each non-edge pixel, and outputting the third gray levels and the fourth gray levels.

2. The image processing apparatus of claim 1, further comprising a boundary detection module for detecting a plurality of vertical boundaries and a plurality of horizontal boundaries between the image blocks.

3. The image processing apparatus of claim 2, wherein the filter module comprises:
a plurality of first filters for performing the smooth processing along a horizontal direction on a plurality of pixels near the vertical boundaries; and
a plurality of second filters for performing the smooth processing along a vertical direction on a plurality of pixels near the horizontal boundaries.

4. The image processing apparatus of claim 3, wherein each of the first filters or each of the second filters is a one-dimension filter.

5. The image processing apparatus of claim 1, wherein the edge detection module calculates a difference between the first gray level and the second gray level, when the difference is larger than a threshold, the edge detection module concludes that the pixel is the edge pixel; however, when the difference is smaller than or equal to the threshold, the edge detection module concludes that the pixel is the non-edge pixel.

6. The image processing apparatus of claim 1, wherein the processing module calculates the third gray level and the fourth gray level by the following equations:

$$G3 = G1*W + G2*(1-W); \text{and}$$

$$G4 = G1*(1-W) + G2*W;$$

wherein G1 represents the first gray level, G2 represents the second gray level, G3 represents the third gray level, G4 represents the fourth gray level, and W represents the weight.

7. The image processing apparatus of claim 6, wherein the weight is 0.8.

8. The image processing apparatus of claim 1, wherein the inputted image complies with one standard selected from a group consisting of: MPEG2, JPEG, and H.263.

9. An image processing method applied to an apparatus for processing an inputted image, the inputted image comprising a plurality of image blocks, each of the image blocks comprising a plurality of pixels, each of the pixels having a first gray level, and the image processing method comprising the steps of:
(a) according to the corresponding location of each pixel in the image block, performing a smooth processing on each of the pixels to generate a second gray level corresponding to each pixel;
(b) according to the first gray level and the second gray level of each pixel, determining each pixel to be an edge pixel or a non-edge pixel;
(c) according to a weight, the first gray level, and the second gray level of each pixel, calculating a third gray level corresponding to each edge pixel; according to the weight, the first gray level, and the second gray level of each non-edge pixel, calculating a fourth gray level corresponding to each non-edge pixel; and
(d) outputting the third gray levels and the fourth gray levels.

10. The method of claim 9, further comprising the step of:
before the step (a), detecting a plurality of vertical boundaries and a plurality of horizontal boundaries between the image blocks.

11. The method of claim 10, wherein the step (a) further comprises the steps of:
utilizing a plurality of first filters to perform the smooth processing along horizontal direction on a plurality of pixels near the vertical boundaries; and
utilizing a plurality of second filters to perform the smooth processing along vertical direction on a plurality of pixels near the horizontal boundaries.

12. The method of claim 11, wherein each of the first filters or each of the second filters is a one-dimension filter.

13. The method of claim 9, wherein the step (b) further comprises the steps of:
calculating a difference between the first gray level and the second gray level; and
judging whether the difference is larger than a threshold, if YES, determining that the pixel is the edge pixel, if NO, determining that the pixel is the non-edge pixel.

14. The method of claim 9, wherein the step (c) calculates the third gray level and the fourth gray level by the following equations:

$$G3 = G1*W + G2*(1-W); \text{and}$$

$$G4 = G1*(1-W) + G2*W;$$

wherein G1 represents the first gray level, G2 represents the second gray level, G3 represents the third gray level, G4 represents the fourth gray level, and W represents the weight.

15. The method of claim 14, wherein the weight is 0.8.

16. The method of claim 9, wherein the inputted image complies with one standard selected from a group consisting of: MPEG2, JPEG, and H.263.

* * * * *